United States Patent
Nakano

(10) Patent No.: US 7,973,969 B2
(45) Date of Patent: Jul. 5, 2011

(54) PRINTING APPARATUS AND METHOD FOR CONTROLLING PRINTING APPARATUS

(75) Inventor: Katsumi Nakano, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 584 days.

(21) Appl. No.: 12/079,487

(22) Filed: Mar. 27, 2008

(65) Prior Publication Data

US 2008/0239356 A1 Oct. 2, 2008

(30) Foreign Application Priority Data

Mar. 27, 2007 (JP) ................................. 2007-082752

(51) Int. Cl.
*H04N 1/60* (2006.01)

(52) U.S. Cl. ......... 358/1.9; 358/504; 358/518; 358/520; 345/204; 345/594; 345/690

(58) Field of Classification Search ................... 358/1.9, 358/3.24, 504, 518, 520; 345/204, 581, 589, 345/590, 593, 594, 684, 688, 690; 715/700, 715/701, 702; 382/162, 167
See application file for complete search history.

(56) References Cited

U.S. PATENT DOCUMENTS

| | | | | |
|---|---|---|---|---|
| 5,784,180 A | * | 7/1998 | Sakai et al. | 358/518 |
| 5,844,542 A | * | 12/1998 | Inoue et al. | 345/594 |
| 5,926,219 A | * | 7/1999 | Shimizu et al. | 348/362 |
| 6,097,510 A | * | 8/2000 | Kanno et al. | 358/518 |
| 7,177,468 B2 | * | 2/2007 | Takeshita et al. | 358/518 |
| 7,515,299 B2 | * | 4/2009 | Asano | 358/1.9 |
| 7,525,684 B2 | * | 4/2009 | Majewicz | 358/1.9 |
| 7,598,964 B2 | * | 10/2009 | Olson | 345/594 |
| 7,652,792 B2 | * | 1/2010 | Honeck et al. | 358/1.9 |
| 2002/0005855 A1 | * | 1/2002 | Mehigan | 345/596 |
| 2002/0163527 A1 | * | 11/2002 | Park | 345/594 |
| 2003/0012436 A1 | * | 1/2003 | Lyford et al. | 382/167 |
| 2003/0103234 A1 | * | 6/2003 | Takabayashi et al. | 358/1.15 |
| 2004/0001229 A1 | * | 1/2004 | Hanyu | 358/518 |
| 2005/0078327 A1 | * | 4/2005 | Majewicz | 358/1.9 |
| 2005/0195453 A1 | * | 9/2005 | Asano | 358/518 |
| 2006/0139665 A1 | * | 6/2006 | Clark | 358/1.9 |
| 2007/0121180 A1 | * | 5/2007 | Ogawa | 358/518 |
| 2007/0146487 A1 | * | 6/2007 | Iguchi | 348/207.2 |
| 2007/0195347 A1 | * | 8/2007 | Momose et al. | 358/1.9 |
| 2007/0216918 A1 | * | 9/2007 | Honeck et al. | 358/1.9 |
| 2007/0273908 A1 | * | 11/2007 | Hoshii | 358/1.9 |
| 2008/0130992 A1 | * | 6/2008 | Fujii | 382/167 |
| 2010/0165118 A1 | * | 7/2010 | Honeck et al. | 358/1.9 |

FOREIGN PATENT DOCUMENTS

JP 09-326940 A 12/1997

(Continued)

*Primary Examiner* — Kimberly A Williams

(74) *Attorney, Agent, or Firm* — Nutter McClennen & Fish LLP; John J. Penny, Jr.

(57) ABSTRACT

The invention provides a printing apparatus that includes: a printing section; a display unit; a touch-sensitive panel that is overlaid on the display unit; a display controlling section; a three-primary-color correcting section that sets a corrected set of values that is recognized by the user as the apparent red, green, and blue base colors on the basis of a comparison made between the position of each of the red, green, and blue display cells that make up the red, green, and blue cell block and a touch position detected by the touch-sensitive panel, respectively; and a print controlling section that controls the printing section to print true red, green, and blue base colors as a color sample that is used when the three-primary-color correcting section performs correction.

5 Claims, 8 Drawing Sheets

FOREIGN PATENT DOCUMENTS

| | | |
|---|---|---|
| JP | 2002-044472 A | 2/2002 |
| JP | 2002-351447 A | 12/2002 |
| JP | 2004-328075 A | 11/2004 |
| JP | 2005-130202 | 5/2005 |
| JP | 2006-191164 | 7/2006 |
| JP | 2006-309462 | 11/2006 |

* cited by examiner

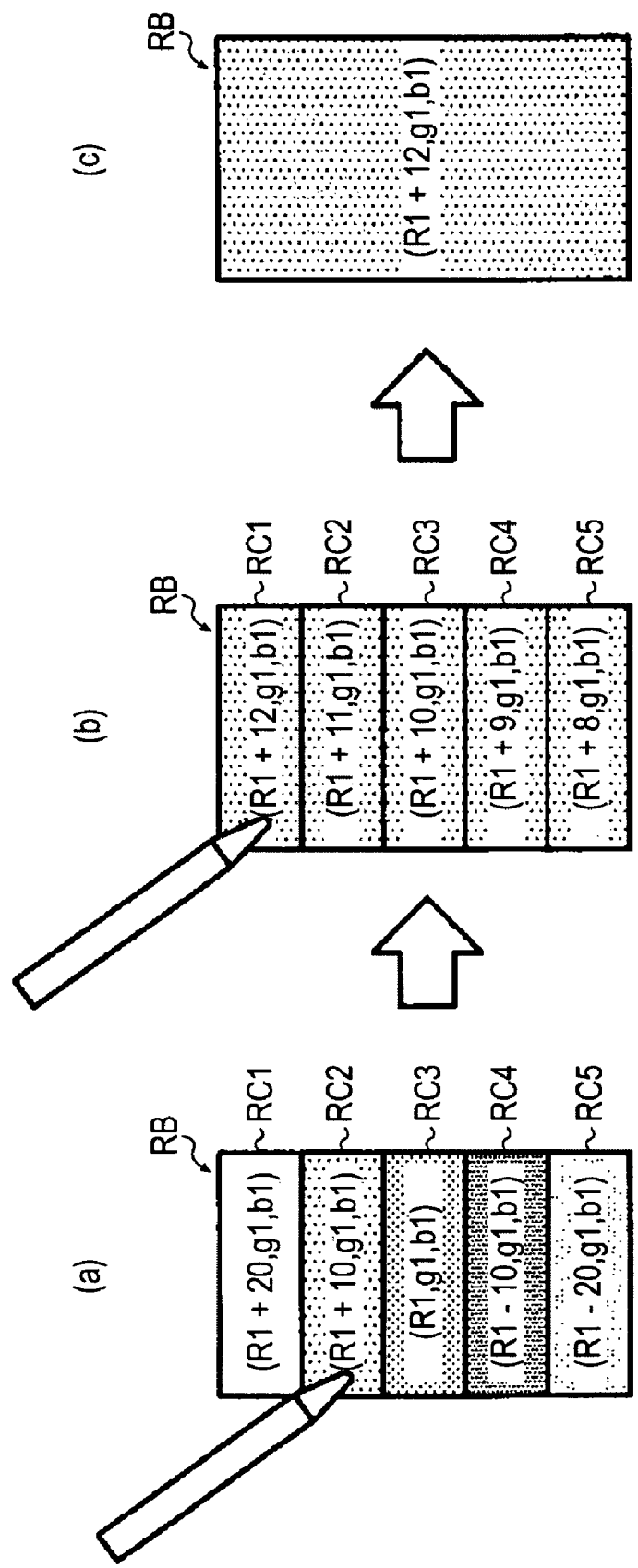

PRINTING APPARATUS AND METHOD FOR CONTROLLING PRINTING APPARATUS

BACKGROUND

1. Technical Field

The present invention relates to a printing apparatus and a method for controlling the printing apparatus.

2. Related Art

In the technical field to which the present invention pertains, a method for correcting a disagreement between a display color and a printed color has been proposed. The "color-shift" (color-drift) correction method of the related art can be applied when a color that is displayed on the screen of a display device is not in agreement with a color that is printed out on a sheet of print target paper. An example of a color-disagreement correction method of the related art is described in JP-A-2005-130202. Specifically, in the related-art method for correcting discordance in a display color and a printed color that is disclosed in the above-identified patent publication, correction is performed as follows. An image of a color chart is taken by means of a color scope. The picked-up image of the color chart is printed out on a sheet of paper by means of a color printer. The same picked-up image of the color chart as that used for printing is outputted on the screen of a color display device. A user compares the color-print output of the picked-up image with the color-display output thereof. Then, for example, as a result of the comparison, if they (i.e., the user) find that the optical intensity of red (R) color component, which is one of three primary colors, is relatively small, they input a color adjustment parameter numerical value(s) so as to increase the optical intensity of R color component among the R, G, and B three primary colors while monitoring an adjustment screen that is presented for color-printer/color-display adjustment.

The color-disagreement correction method of the related art that is described in the above-identified patent publication (JP-A-2005-130202) has a disadvantage in that it requires a relatively burdensome color-adjustment manipulation because it is necessary to acquire an image of a color chart by means of a color scope. In addition, the color-disagreement correction method described in the above-identified patent publication has another disadvantage in that it is difficult to intuitively know the result of color adjustment during the color-adjustment manipulation process because the color adjustment parameters are changed through the inputting of numerical values. That is, a user cannot intuitively recognize the anticipated color-adjustment result of an input of a certain numerical value during the color-adjustment manipulation process. Some printing apparatuses have a touch-sensitive input device. In a typical configuration of a touch-sensitive input device, a touch-sensitive panel is placed on the surface of a display screen. When a user observes a certain display color that is shown on the display screen of a touch-sensitive printing apparatus, it follows that they observe the display color not directly but indirectly through the touch-sensitive panel fixed thereto. For this reason, the recognized color thereof, that is, not true color thereof, tends to be slightly "yellowish". In comparison with a non-touch-sensitive printing apparatus that is not provided with a touch-sensitive panel placed on the display screen thereof, a color disagreement between a display color and a printed color is more likely to occur in a touch-sensitive printing apparatus that is provided with a touch-sensitive panel placed on the display screen thereof. Accordingly, color-adjustment manipulation is more likely to be required in the touch-sensitive printing apparatus in which a user observes a certain display color that is shown on the display screen thereof indirectly through a touch-sensitive panel fixed thereto. Therefore, there has been a demand for a novel and inventive technique that enables a user to perform color-disagreement correction in an intuitive and easy manner while visually confirming a resultant display color that will be obtained after the execution of the color-disagreement correction.

SUMMARY

An advantage of some aspects of the invention is to provide a printing apparatus that makes it possible for a user to perform color-disagreement correction, if an apparent display color that is observed through a touch-sensitive panel is not in agreement with a true color thereof, in an intuitive and easy manner while visually confirming a resultant display color that will be obtained after the execution of the color-disagreement correction. In addition, the invention further provides, as an advantage of some aspects thereof, a method for controlling the printing apparatus having such a capability.

In order to address the above-identified problems without any limitation thereto, the invention adopts any of the following novel and inventive configurations and features.

The invention provides, as a first aspect thereof, a printing apparatus that includes: a printing section that performs printing on a print target medium; a display unit that displays various kinds of information; a touch-sensitive panel that is overlaid on a surface of the display unit and detects a position touched by a user; a display controlling section that controls the display unit so as to display a red cell block, a green cell block, and a blue cell block, the red cell block being made up of an array of a plurality of red display cells in which the value of a red color component only changes stepwise with a certain set of values of red, green, and blue shown on the display unit being taken as a base set of values, the base set of values being preset so as to be recognized by the user as an apparent red base color when observed not directly but indirectly through the touch-sensitive panel, the green cell block being made up of an array of a plurality of green display cells in which the value of a green color component only changes stepwise with a certain set of values of red, green, and blue shown on the display unit being taken as a base set of values, the base set of values being preset so as to be recognized by the user as an apparent green base color when observed not directly but indirectly through the touch-sensitive panel, the blue cell block being made up of an array of a plurality of blue display cells in which the value of a blue color component only changes stepwise with a certain set of values of red, green, and blue shown on the display unit being taken as a base set of values, the base set of values being preset so as to be recognized by the user as an apparent blue base color when observed not directly but indirectly through the touch-sensitive panel; a three-primary-color correcting section that sets a corrected set of values that is recognized by the user as the apparent red base color, a corrected set of values that is recognized by the user as the apparent green base color, and a corrected set of values that is recognized by the user as the apparent blue base color on the basis of a comparison made between the position of each of the red display cells that make up the red cell block, the position of each of the green display cells that make up the green cell block, and the position of each of the blue display cells that make up the blue cell block and a touch position detected by the touch-sensitive panel, respectively; and a print controlling section that controls the printing section to print not the apparent red base color, the apparent green base color, and the apparent blue base color but a true red base color, a true green base color, and a true blue base color as a color sample that is used when the three-primary-color correcting section performs correction.

In the configuration of a printing apparatus according to the first aspect of the invention described above, the display controlling section controls the display unit so as to display a red cell block, a green cell block, and a blue cell block. Herein, the red cell block is made up of an array of a plurality of red display cells in which the value of a red color component only changes stepwise with a certain set of values of red, green, and blue shown on the display unit being taken as a base set of values. The base set of values is preset so as to be recognized by the user as an apparent red base color when observed not directly but indirectly through the touch-sensitive panel. Each of the green cell block and the blue cell block has a configuration that is the same as (similar to) that of the red cell block described above. A user visually compares a printed color of a printed color sample with each of apparent display colors that is observed not directly but indirectly through the touch-sensitive panel. Then, the user touches the display cell that is visually recognized as an apparent display color closest to the printed color of the printed color sample. Upon the touching thereof, the three-primary-color correcting section of the printing apparatus sets a corrected set of values that is recognized by the user as the apparent red base color, a corrected set of values that is recognized by the user as the apparent green base color, and a corrected set of values that is recognized by the user as the apparent blue base color on the basis of a comparison made between the position of each of the red display cells that make up the red cell block, the position of each of the green display cells that make up the green cell block, and the position of each of the blue display cells that make up the blue cell block and a touch position detected by the touch-sensitive panel, respectively. With the configuration of a printing apparatus according to the first aspect of the invention described above, since each of the display cells of the cell block has an individual display color, when a user touches any one of these display cells, it is possible for the user to intuitively know the result of color correction during the color-correction manipulation process because the color-correction parameters are changed not through the inputting of numerical values but through the selecting of a colored display cell. That is, the user can intuitively recognize the anticipated color-correction result of a selection of a certain colored display cell during the color-correction manipulation process. Therefore, it is possible for the user to perform color-disagreement correction, if an apparent display color that is shown on the display unit and observed not directly but indirectly through the touch-sensitive panel fixed thereto is not in agreement with a true color thereof, in an intuitive manner while visually confirming a resultant display color that will be obtained after the execution of the color-disagreement correction. In addition, it is possible for a user to make a color-disagreement judgment as to whether an apparent display color that is shown on the display unit and observed not directly but indirectly through the touch-sensitive panel fixed thereto is in agreement with a true color thereof or not in an easy manner by visually comparing a color sample that is printed out by a printing apparatus according to the first aspect of the invention described above with the above-described apparent display color that is shown on the display unit and observed not directly but indirectly through the touch-sensitive panel fixed thereto.

In the configuration of a printing apparatus according to the first aspect of the invention described above, it is preferable that the set of values of red, green, and blue can be changed in a predetermined number of increments; the display controlling section should scale the values of red color components of the red display cells that are arrayed in the red cell block initially in a certain number of increments, and upon the touching of a certain red display cell among the plurality of red display cells by a user, should re-scale the touched display cell in increments of one so as to be displayed in a plurality of separate display cells, should scale the values of green color components of the green display cells that are arrayed in the green cell block initially in a certain number of increments, and upon the touching of a certain green display cell among the plurality of green display cells by a user, should re-scale the touched display cell in increments of one so as to be displayed in a plurality of separate display cells, and should scale the values of blue color components of the blue display cells that are arrayed in the blue cell block initially in a certain number of increments, and upon the touching of a certain blue display cell among the plurality of blue display cells by a user, should re-scale the touched display cell in increments of one so as to be displayed in a plurality of separate display cells; and the three-primary-color correcting section performs correction on the basis of a comparison made between the position of each of the red display cells of the red cell block whose red component values are re-scaled in increments of one, the position of each of the green display cells of the green cell block whose green component values are re-scaled in increments of one, the position of each of the blue display cells of the blue cell block whose blue component values are re-scaled in increments of one and a touch position detected by the touch-sensitive panel, respectively. With such a preferred configuration, it is possible for a user to perform a rough color matching by means of initially scaled display cells with a larger increment value. Thereafter, the user can perform a fine color matching by means of re-scaled display cells with a smaller increment value. Therefore, in comparison with a case where color matching is performed by means of a fine increment value only without the use of a larger increment value at its initial color-matching stage, it is possible for a user to complete color-disagreement correction in a shorter time period in a more efficient manner.

In the configuration of a printing apparatus according to the first aspect of the invention described above, it is preferable that, when it is judged that a user has instructed a hue change for any of the red cell block, the green cell block, or the blue cell block on the basis of information on a touch position detected by the touch-sensitive panel, the display controlling section should update the red cell block by changing the values of green and blue thereof without changing the value of red thereof so as to have a plurality of updated red display cells if the red cell block is the above-mentioned hue-change-instructed cell block, should update the green cell block by changing the values of blue and red thereof without changing the value of green thereof so as to have a plurality of updated green display cells if the green cell block is the above-mentioned hue-change-instructed cell block, and should update the blue cell block by changing the values of red and green thereof without changing the value of blue thereof so as to have a plurality of updated blue display cells if the blue cell block is the above-mentioned hue-change-instructed cell block. With such a preferred configuration, even when a certain apparent red color that is shown on the display unit and monitored not directly but indirectly through the touch-sensitive panel fixed thereto has a greater or lesser tinge of yellow than that of a red base color, a user can adjust the tinge of yellow of the displayed red, or in other words, a user can instruct a hue change of the displayed red. Through such a hue-control instruction, the user can make correction so that the displayed red comes closer to the red base color.

In the configuration of a printing apparatus according to the first aspect of the invention described above, it is preferable that the red base color, the green base color, and the blue base color should be pure red, pure green, and pure blue, respectively. With such a preferred configuration, when a user makes a visual comparison between a printed color of a printed color sample and an apparent display colors that is observed not directly but indirectly through the touch-sensitive panel, it is possible for the user to perform color matching with a higher color-matching precision in comparison with a case where each of the red base color, the green base color, and the blue base color is not pure color but other neutral color. If each value of a red color component, a green color component, and a blue color component of RGB data is represented as eight-bit data, pure red, pure green, and pure blue are defined as colors that are expressed as (255, 0, 0), (0, 255, 0), and (0, 0, 255), respectively.

The invention provides, as a second aspect thereof, a method for controlling, by means of a computer software, a printing apparatus that includes a printing section that performs printing on a print target medium, a display unit that displays various kinds of information, and a touch-sensitive panel that is overlaid on a surface of the display unit and detects a position touched by a user; the controlling method including: (a) controlling the display unit so as to display a red cell block, a green cell block, and a blue cell block, the red cell block being made up of an array of a plurality of red display cells in which the value of a red color component only changes stepwise with a certain set of values of red, green, and blue shown on the display unit being taken as a base set of values, the base set of values being preset so as to be recognized by the user as an apparent red base color when observed not directly but indirectly through the touch-sensitive panel, the green cell block being made up of an array of a plurality of green display cells in which the value of a green color component only changes stepwise with a certain set of values of red, green, and blue shown on the display unit being taken as a base set of values, the base set of values being preset so as to be recognized by the user as an apparent green base color when observed not directly but indirectly through the touch-sensitive panel, the blue cell block being made up of an array of a plurality of blue display cells in which the value of a blue color component only changes stepwise with a certain set of values of red, green, and blue shown on the display unit being taken as a base set of values, the base set of values being preset so as to be recognized by the user as an apparent blue base color when observed not directly but indirectly through the touch-sensitive panel; (b) setting a corrected set of values that is recognized by the user as the apparent red base color, a corrected set of values that is recognized by the user as the apparent green base color, and a corrected set of values that is recognized by the user as the apparent blue base color on the basis of a comparison made between the position of each of the red display cells that make up the red cell block, the position of each of the green display cells that make up the green cell block, and the position of each of the blue display cells that make up the blue cell block and a touch position detected by the touch-sensitive panel, respectively; and (c) controlling the printing section to print not the apparent red base color, the apparent green base color, and the apparent blue base color but a true red base color, a true green base color, and a true blue base color as a color sample that is used when correction is performed.

In the printing-apparatus controlling method according to the second aspect of the invention described above, a red cell block, a green cell block, and a blue cell block are displayed on the display unit. Herein, the red cell block is made up of an array of a plurality of red display cells in which the value of a red color component only changes stepwise with a certain set of values of red, green, and blue shown on the display unit being taken as a base set of values. The base set of values is preset so as to be recognized by the user as an apparent red base color when observed not directly but indirectly through the touch-sensitive panel. Each of the green cell block and the blue cell block has a configuration that is the same as (similar to) that of the red cell block described above. A user visually compares a printed color of a printed color sample with each of apparent display colors that is observed not directly but indirectly through the touch-sensitive panel. If the user recognizes that any of these apparent colors that are currently displayed is satisfactorily close to the printed color of the printed color sample, they touch the display cell. Upon the touching thereof, a corrected set of values that is recognized by the user as the apparent red base color, a corrected set of values that is recognized by the user as the apparent green base color, and a corrected set of values that is recognized by the user as the apparent blue base color are set on the basis of a comparison made between the position of each of the red display cells that make up the red cell block, the position of each of the green display cells that make up the green cell block, and the position of each of the blue display cells that make up the blue cell block and a touch position detected by the touch-sensitive panel, respectively. With a printing-apparatus controlling method according to the second aspect of the invention described above, since each of the display cells of the cell block has an individual display color, when a user touches any one of these display cells, it is possible for the user to intuitively know the result of color correction during the color-correction manipulation process because the color-correction parameters are changed not through the inputting of numerical values but through the selecting of a colored display cell. That is, the user can intuitively recognize the anticipated color-correction result of a selection of a certain colored display cell during the color-correction manipulation process. Therefore, it is possible for the user to perform color-disagreement correction, if an apparent display color that is shown on the display unit and observed not directly but indirectly through the touch-sensitive panel fixed thereto is not in agreement with a true color thereof, in an intuitive manner while visually confirming a resultant display color that will be obtained after the execution of the color-disagreement correction. In addition, it is possible for a user to make a color-disagreement judgment as to whether an apparent display color that is shown on the display unit and observed not directly but indirectly through the touch-sensitive panel fixed thereto is in agreement with a true color thereof or not in an easy manner by visually comparing a color sample that is printed out by a printing apparatus according to the first aspect of the invention described above with the above-described apparent display color that is shown on the display unit and observed not directly but indirectly through the touch-sensitive panel fixed thereto. It should be noted that further step(s) may be added to the above basic steps of the printer-apparatus controlling method according to the second aspect of the invention described above in order to realize operation/working-effects and/or functions that are offered by constituent elements of the printing apparatus according to the first aspect of the invention described above.

BRIEF DESCRIPTION OF THE DRAWINGS

The invention will be described with reference to the accompanying drawings, wherein like numbers reference like elements.

FIG. 5A is a diagram that schematically illustrates an example of a message screen that is displayed prior to the execution of color-sample printing, whereas

FIG. 8 is a display transition diagram that schematically illustrates an example of the re-scaling of the RGB data of a touched display cell into a plurality of separate display cells in smaller increments and the subsequent conclusive determination of an apparent pure color for a red cell block according to an exemplary embodiment of the invention.

DESCRIPTION OF EXEMPLARY EMBODIMENTS

Figure 1:
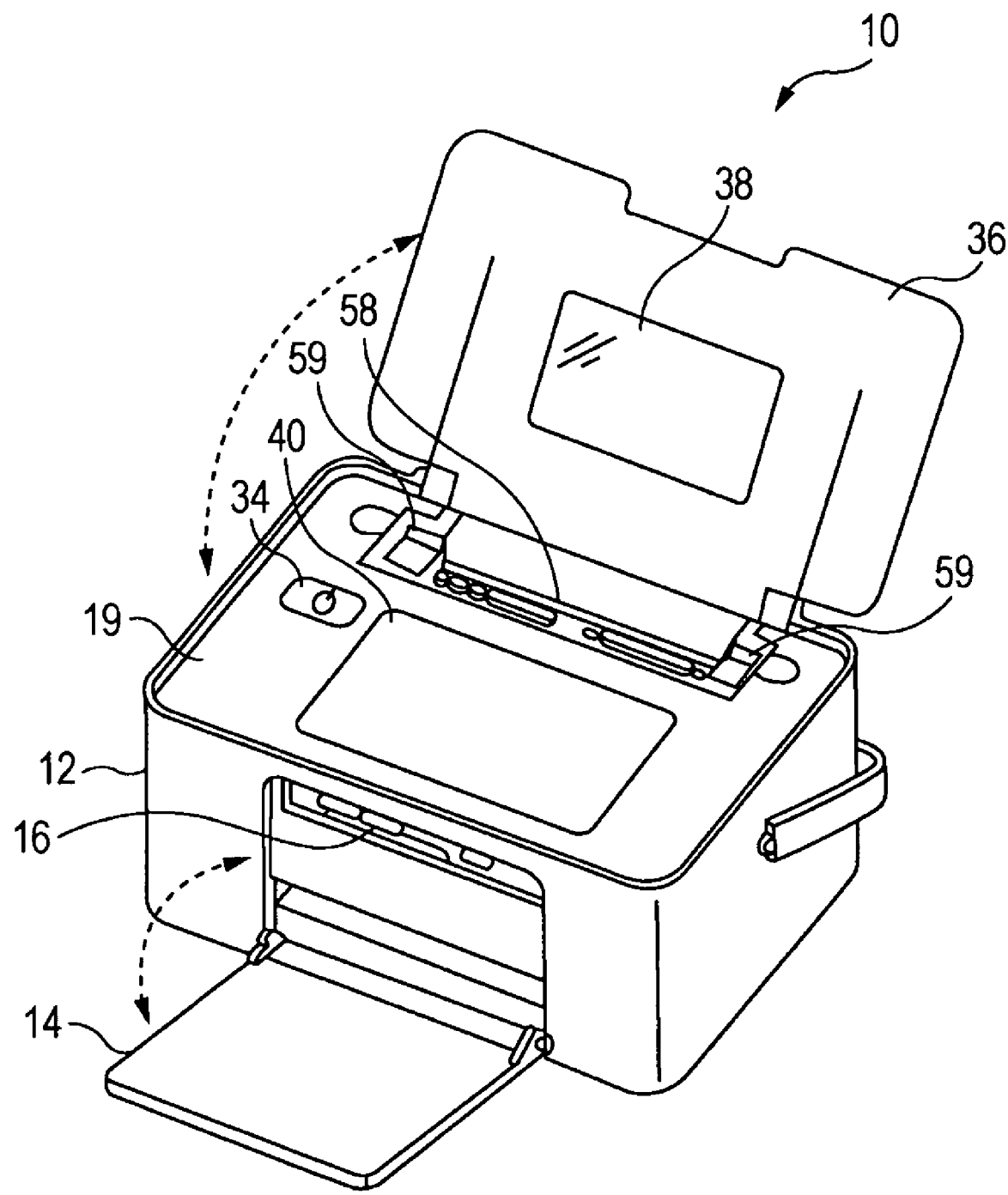
FIG. 1 is a perspective view that schematically illustrates an example of the configuration of a photo-printer, which is an example of an image processing apparatus according to an exemplary embodiment of the invention, where, in the illustrated example, a front flap of the photo-printer and a cover thereof are opened.
Figure 2:
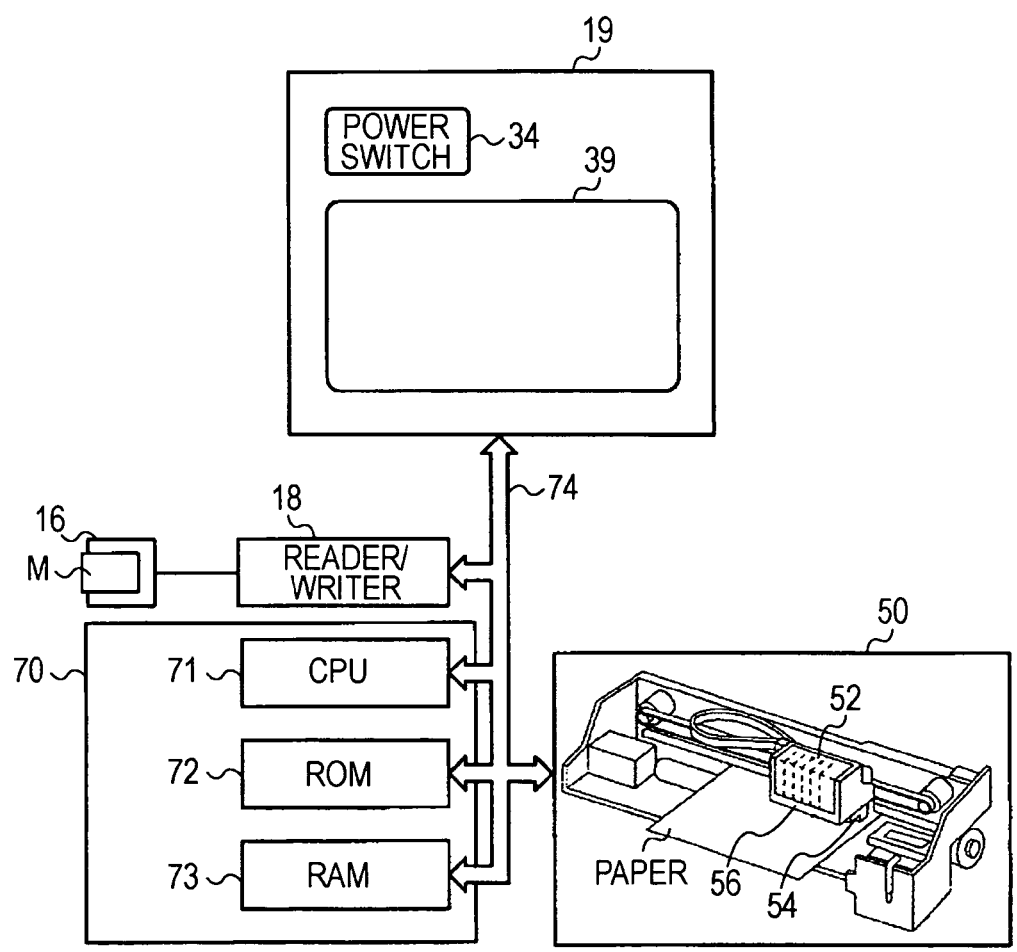
FIG. 2 is a diagram that schematically illustrates an example of the electric configuration of the photo-printer illustrated in FIG. 1.
Figure 3:
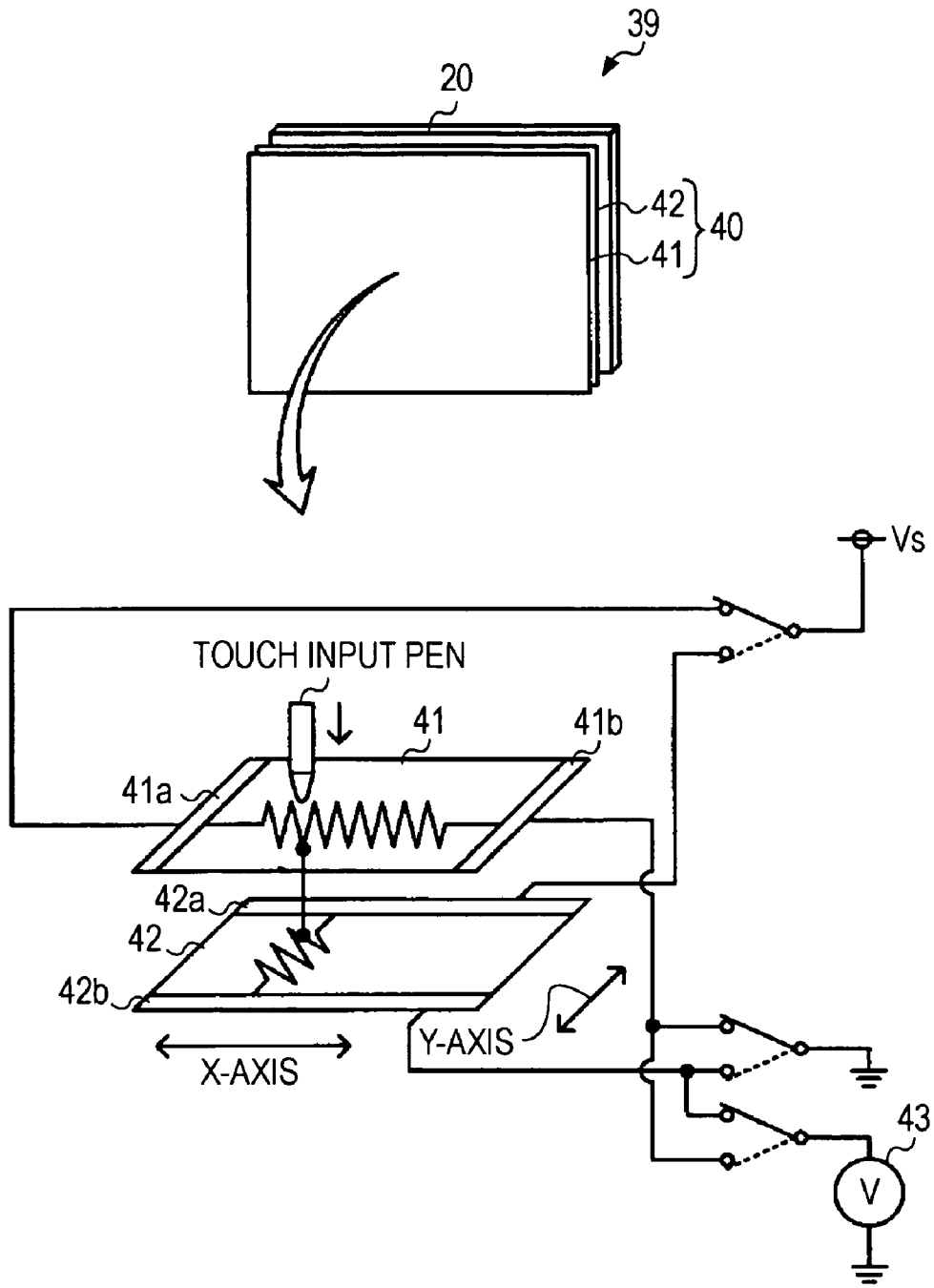
FIG. 3 is an electric circuit diagram that schematically illustrates an example of the configuration of a touch-sensitive panel, which constitutes a part of a user operation panel according to an exemplary embodiment of the invention.

With reference to accompanying drawings, an exemplary embodiment of the present invention is explained below. FIG. 1 is a perspective view that schematically illustrates an example of the configuration of a photo-printer 10, which is an example of an image processing apparatus according to an exemplary embodiment of the invention. In the illustrated example, a front flap 14 of the photo-printer 10 is opened. In addition, a cover 36 of the photo-printer 10 is also opened. FIG. 2 is a diagram that schematically illustrates an example of the electric configuration of the photo-printer 10 illustrated in FIG. 1. FIG. 3 is an electric circuit diagram that schematically illustrates an example of the configuration of a touch-sensitive panel 40, which constitutes a part of a user operation panel 19 according to an exemplary embodiment of the invention.

The photo-printer 10 according to the present embodiment of the invention is provided with the user operation panel 19, the cover 36, a printing mechanism 50, the front flap 14, and a controller 70. The user operation panel 19 is provided on the inner top face of a printer body 12 of the photo-printer 10. The cover 36 is provided over the inner top face of the printer body 12 in such a manner that the cover 36 hinges on the distal edge of the inner top face of the printer body 12. When the cover 36 is in a closed position, it covers the surface of the user operation panel 19. The printing mechanism 50 is built inside the printer body 12. The front flap 14 hinges so as to open and close the front face of the printer body 12. The controller 70 is responsible for controlling the operation of the photo-printer 10 as a whole. The printing mechanism 50 and the controller 70 are illustrated in FIG. 2. It should be noted that the controller 70 described in the present embodiment of the invention corresponds to a "display controlling section", a "three-primary-color correcting section", and a "print controlling section" according to an aspect of the invention.

The user operation panel 19 is provided with a push-button power switch 34 and a touch-sensitive input device 39. At each time when a user presses down the push-button power switch 34, it switches over between a power ON state and a power OFF state. The touch-sensitive input device 39 enables a user to input an instruction, selection, or the like, by means of a touch input pen. As illustrated in FIG. 3, the touch-sensitive input device 39 is made up of an image display unit 20 and the touch-sensitive panel 40. The image display unit 20 displays characters, figures, symbols, and the like. The touch-sensitive panel 40 is configured as a resistive-film type transparent panel. The touch-sensitive panel 40 is placed on and fixed to the image display unit (i.e., image display panel) 20 in such a manner that they constitute a single integrated dual-layer panel with these layers overlapping each other. The image display unit 20 is configured as a well-known color liquid crystal display. In the configuration of the image display unit 20, a plurality of pixels is arrayed in a matrix pattern with an equal pixel pitch each between two adjacent pixels. An activation/switching element such as a thin film transistor (hereafter abbreviated as TFT) is provided for each of the plurality of pixels. With such a configuration, each of the plurality of pixels is driven through the corresponding TFT. The touch-sensitive panel 40 is made up of a first electro-conductive film (i.e., conductive film) 41 and a second electro-conductive film 42. The first electro-conductive film 41 and the second electro-conductive film 42 are provided opposite to each other with a certain space being allocated therebetween by means of dot spacers. These dot spacers are not shown in the drawing. In the illustrated example, the first electro-conductive film 41 has one electrode 41a at the left edge thereof and the other electrode 41b at the right edge thereof. The second electro-conductive film 42 according to the illustrated example has one electrode 42a at the top edge thereof and the other electrode 42b at the bottom edge thereof. The electric state of the above-mentioned one electrode 41a of the first electro-conductive film 41 can be switched between one state in which a constant voltage Vs is applied thereto and the other state in which the constant voltage Vs is not applied thereto. On the other hand, the electric state of the above-mentioned other electrode 41b of the first electro-conductive film 41 can be switched between one state in which it is directly grounded and the other state in which it is indirectly grounded via a voltmeter 43. Similar to the connection switchover of the electrodes 41a and 41b of the first electro-conductive film 41 described above, the electric state of the above-mentioned one electrode 42a of the second electro-conductive film 42 can be switched between one state in which the constant voltage Vs is applied thereto and the other state in which the constant voltage Vs is not applied thereto; on the other hand, the electric state of the above-mentioned other electrode 42b of the second electro-conductive film 42 can be switched between one state in which it is directly grounded and the other state in which it is indirectly grounded via the voltmeter 43. When a user performs some inputting manipulation on the touch-sensitive panel 40 by means of a touch input pen, the first electro-conductive film 41 and the second electro-conductive film 42 become electrically connected to each other because they become regionally press-contacted by the pen pressure applied by the user at an input position(s) (hereafter may be referred to as a "touch position" as long as the context allows). Since the aforementioned dot spacers, which are not shown in the drawing, are arrayed with a predetermined interval each therebetween, the first electro-conductive film 41 and the second electro-conductive film 42 become press-contacted by the pen pressure applied by the user and thus become electrically connected to each other at a region(s) where these dot spacers are not provided. In the following description, the detection of a pen input position is explained. As a first step of the detection of a pen input position, the switch state of the first electro-conductive film 41 is set in such a manner that the constant voltage Vs is applied to the above-mentioned one electrode 41a thereof whereas the above-mentioned other electrode 41b thereof is directly grounded. In addition, the switch state of the second electro-conductive film 42 is set in such a manner that the constant voltage Vs is not applied to the above-mentioned one electrode 42a thereof whereas the above-mentioned other electrode 42b thereof is indirectly grounded via the voltmeter 43. The above-explained switch states are shown in solid lines in FIG. 3. In the above-described respective switch states of the first electro-conductive film 41 and the second electro-conductive film 42, the voltage value of the voltmeter 43 is determined depending on the X coordinate of a pen input position. Therefore, it is possible to identify, that is, locate, the X coordinate of a pen input position on the basis of a readout voltage value of the voltmeter 43. In the next step of the detection of a pen input position, the switch state of the first electro-conductive film 41 is set in such a manner that the constant voltage Vs is not applied to the above-mentioned one electrode 41a thereof whereas the above-mentioned other electrode 41b thereof is indirectly grounded via the voltmeter 43. In addition, the switch state of the second electro-conductive film 42 is set in such a manner that the constant voltage Vs is applied to the above-mentioned one electrode 42a thereof whereas the above-mentioned other electrode 42b thereof is directly grounded. The above-explained switch states are shown in dotted lines in FIG. 3. In the above-described respective switch states of the first electro-conductive film 41 and the second electro-conductive film 42, the voltage value of the voltmeter 43 is determined depending on the Y coordinate of a pen input position. Therefore, it is possible to identify (i.e., locate) the Y coordinate of a pen input position on the basis of a readout voltage value of the voltmeter 43. Since the touch-sensitive panel 40 is configured as a transparent panel as has already been explained earlier, a user can monitor and visually recognize content that is displayed on the image display unit 20 through the touch-sensitive panel 40.

The cover 36, which is made of a resin, has the shape of a molded plate that is large enough to cover the inner top face of the printer body 12. When the cover 36 is in an open position, the manipulation surface of the user operation panel 19 is exposed to the outside (refer to FIG. 1). When the cover 36 is in a closed position, it covers the surface of the user operation panel 19 as a whole. The cover 36 has a viewing window 38 that has substantially the same size as that of the image display unit 20. The viewing window 38 allows a user to view content displayed in the image display unit 20 without opening the cover 36. That is, when the cover 36 is in a closed position, a user can view content displayed in the image display unit 20 through the viewing window 38. On the other hand, when the cover 36 is in an open state, the posture thereof is held in such a manner that it is tilted backward with respect to, that is, as viewed from, the user operation panel 19 (or, in other words, as viewed from a user). Therefore, in such a slanted open position, the rear face of the cover 36 functions as a paper-feed tray, which is used for feeding a sheet of print target paper to the printing mechanism 50. A paper-feed port 58 of the printing mechanism 50 is provided at the back (i.e., distal area) of the user operation panel 19. A pair of paper-guiding members 59 that can be moved in a horizontal direction in a sliding manner so as to adjust the paper-guiding width thereof into the width of a sheet of print target paper is provided.

The printing mechanism 50 is built inside the printer body 12 of the photo-printer 1. The printing mechanism 50 is configured as a well-known ink-jet print mechanical unit, that is, a print engine. The printing mechanism 50 performs printing on a sheet of print target paper that is transported in the sub-scan direction while moving a carriage 56 in the main-scan direction. A print head 54, which discharges ink drops onto a sheet of print target paper, is mounted on the carriage 56. The traveling direction of the carriage 56, that is, the main-scan direction, is shown as a horizontal orientation (i.e., right side to left side, and vice versa) in FIG. 2. The transport direction of a sheet of print target paper, that is, the sub-scan direction, is shown as a vertical orientation (i.e., distal side to proximal side) in FIG. 2. In the illustrated example, it is assumed that the printing mechanism 50 is configured as an on-carriage type print engine. In the configuration of an on-carriage type printing mechanism, ink cartridges 52 each of which supplies ink to the print head 54 are detachably attached to the carriage 56. Notwithstanding the foregoing, the printing mechanism 50 may be configured as an off-carriage type print engine. That is, the ink cartridges 52 may be mounted at positions that are not on the carriage 56. As a non-limiting exemplary configuration of the print head 54, a popular piezoelectric pressure-generating scheme may be adopted in which a voltage is applied to piezoelectric elements so as to deform (i.e., deflect) them. In such a configuration, ink is pressurized as a result of the deformation of the voltage-applied piezoelectric elements. As another non-limiting exemplary configuration of the print head 54 that can be adopted as a substitute for the piezoelectric pressure-generating scheme explained above, a thermal pressure-generating scheme may be adopted in which a voltage is applied to an exothermic body such as a heater so as to heat ink. In such a configuration, ink is pressurized by air bubbles that are generated as a result of the heating thereof.

The front flap 14 is a cover that opens/closes the front of the printer body 12 of the photo-printer 10. When the front flap 14 is in an open position, it functions as a paper-eject tray that receives a sheet of print-completed paper that is ejected out of the printing mechanism 50 through the front of the printer body 12 thereof. In addition, when the front flap 14 is in the open position, a user can physically access to (i.e., use) a memory card slot 16 that is provided at the inner front face of the printer body 12 thereof. When the front flap 14 is open, a user can insert various kinds of memory cards M into the memory card slot 16 or remove the memory cards M therefrom. The memory card M stores, for example, a plurality of JPEG image files. Upon the recognition of the insertion of the memory card M into the memory card slot 16, the controller 70 assigns a photograph number (i.e., image number) to each photograph image that is stored in the memory card M in such a manner that these numbers are assigned in an ascending order of shooting date and time. That is, the smallest picture number is given to the picture image that has the earliest shooting date and time (i.e., old photograph image), whereas the largest picture number is given to the picture image that has the latest shooting date and time (i.e., newest photograph image). That is, the controller 70 assigns the above-explained photograph number to each photograph image that is stored in the memory card M and has a possibility to be selected by a user as a print target image.

As illustrated in FIG. 2, the controller 70 is configured as a microprocessor having a CPU 71 as its central function unit. In addition to the CPU 71, the controller 70 further includes a ROM 72 in which various kinds of programs, data, and the like are stored, and a RAM 73 that is used as a temporary data storage. These components are connected to one another via a bus 74 in such a manner that signals can be sent therebetween for internal data communication. In addition to the CPU 71, the ROM 72, and the RAM 73 of the controller 70, a reader/writer 18 as well as the aforementioned user operation panel 19 and printing mechanism 50 are also electrically connected to the bus 74. The controller 70 receives, through the reader/writer 18, a photograph image that is read out of the memory card M inserted in the memory card slot 16 as an image input. In addition, the controller 70 receives a detection signal that is sent from each component unit of the printing mechanism 50 as a signal input. Moreover, the controller 70 receives a user instruction signal that is inputted by means of the touch-sensitive panel 40 of the user operation panel 19. On the other hand, the controller 70 commands an edited image to be saved in the memory card M via the reader/writer 18. In addition, the controller 70 outputs a control signal to the print head 54 of the printing mechanism 50. Moreover, the controller 70 outputs a control signal to the image display unit 20 of the user operation panel 19. Note that the input/output functions of the controller 70 are not limited those explained above.

Herein, it is assumed that each display color that is displayed on the image display unit 20 of the user operation panel 19 is represented in the form of red-green-blue (RGB) data. It is further assumed herein that each of a red (R) color component, a green (G) color component, and a blue (B) color component thereof is represented in eight bits. Under such an assumption, each value of the R color component, the G color component, and the B color component is determined within a range from zero (0) to 255. In the configuration of the user operation panel 19 (or, more specifically, touch-sensitive input device 39), as has already been explained earlier, the touch-sensitive panel 40 is placed on and fixed to the image display unit 20 in such a manner that they constitute a single integrated dual-layer panel with these layers overlapping each other. Therefore, when a user observes a certain display color that is shown on the image display unit 20, it follows that they observe the display color not directly but indirectly through the touch-sensitive panel 40 fixed thereto. For this reason, when a user monitors a certain display color that is shown on the image display unit 20 not directly but indirectly through the touch-sensitive panel 40 fixed thereto, the recognized color thereof, that is, not true color thereof, tends to be relatively "yellowish" in comparison with a case where the user monitors the same display color directly, that is, not through any touch-sensitive panel (40). If there were not any touch-sensitive panel (40) that is placed on and fixed to the image display unit 20, a user would visually recognize that a display color shown on the image display unit 20 is pure red when the RGB data thereof is (255, 0, 0). It should be noted that in the foregoing three-dimensional chromatic coordinate of the RGB data of (255, 0, 0), the first value 255 denotes a red (R) value of the display color, whereas the second value 0 and the third value 0 denote a green (G) value of the display color and a blue (B) value thereof, respectively. The same holds true in the following description. If there were not any touch-sensitive panel (40) that is placed on and fixed to the image display unit 20, a user would visually recognize that a display color shown on the image display unit 20 is pure green when the RGB data thereof is (0, 255, 0). Under the same hypothetical assumption, a user would visually recognize that a display color shown on the image display unit 20 is pure blue when the RGB data thereof is (0, 0, 255). In contrast, since the photo-printer 10 according to the present embodiment of the invention is provided with the touch-sensitive input device 39 that is made up of the touch-sensitive panel 40 and the image display unit 20 as has already been explained above, it follows that a user actually observes a display color shown on the image display unit 20 not directly but indirectly through the touch-sensitive panel 40 fixed thereto. Therefore, the user visually recognizes that a display color shown on the image display unit 20 is pure red when the RGB data thereof is not (255, 0, 0) but (R1, g1, b1). In this specification, this recognized color is referred to as an "apparent pure red", which is a concept adopted herein in contrast to true pure red. In the same way as above, the user visually recognizes that a display color shown on the image display unit 20 is pure green when the RGB data thereof is not (0, 255, 0) but (r2, G2, b2), which constitutes an apparent pure green, whereas the user visually recognizes that a display color shown on the image display unit 20 is pure blue when the RGB data thereof is not (0, 0, 255) but (r3, g3, B3), which constitutes an apparent pure blue. With due considerations to the above, factory default color-correction parameters are preset in the photo-printer 10. As the RGB data thereof is corrected by means of such color-correction parameters, a user can visually recognize a display color that is shown on the image display unit 20 without feeling any sense of unnaturalness not directly but indirectly through the touch-sensitive panel 40 fixed thereto.

Next, an explanation is given below of the operation of the photo-printer 10 having the above-described configuration. Specifically, in the following description, it is explained as to how the photo-printer 10, which is an example of an image processing apparatus according to an exemplary embodiment of the invention, performs the color correction of the user operation panel 19 thereof. As has already been explained earlier, when a user observes a certain display color that is shown on the image display unit 20, it follows that they observe the display color not directly but indirectly through the touch-sensitive panel 40 fixed thereto. If the use of the aforementioned color-correction parameters that are preset in the photo-printer 10 is continued without any subsequent user-side change from its factory default setting, a user might feel some sense of unnaturalness in a display color because of, for example, the long-term deterioration of the touch-sensitive panel 40. In order to overcome such an aged-panel-deterioration problem, the photo-printer 10 is configured in such a manner that a user can change the color-correction parameters at their side by giving parameter change instructions on a main menu screen, which is not shown in the drawing.

Figure 4:
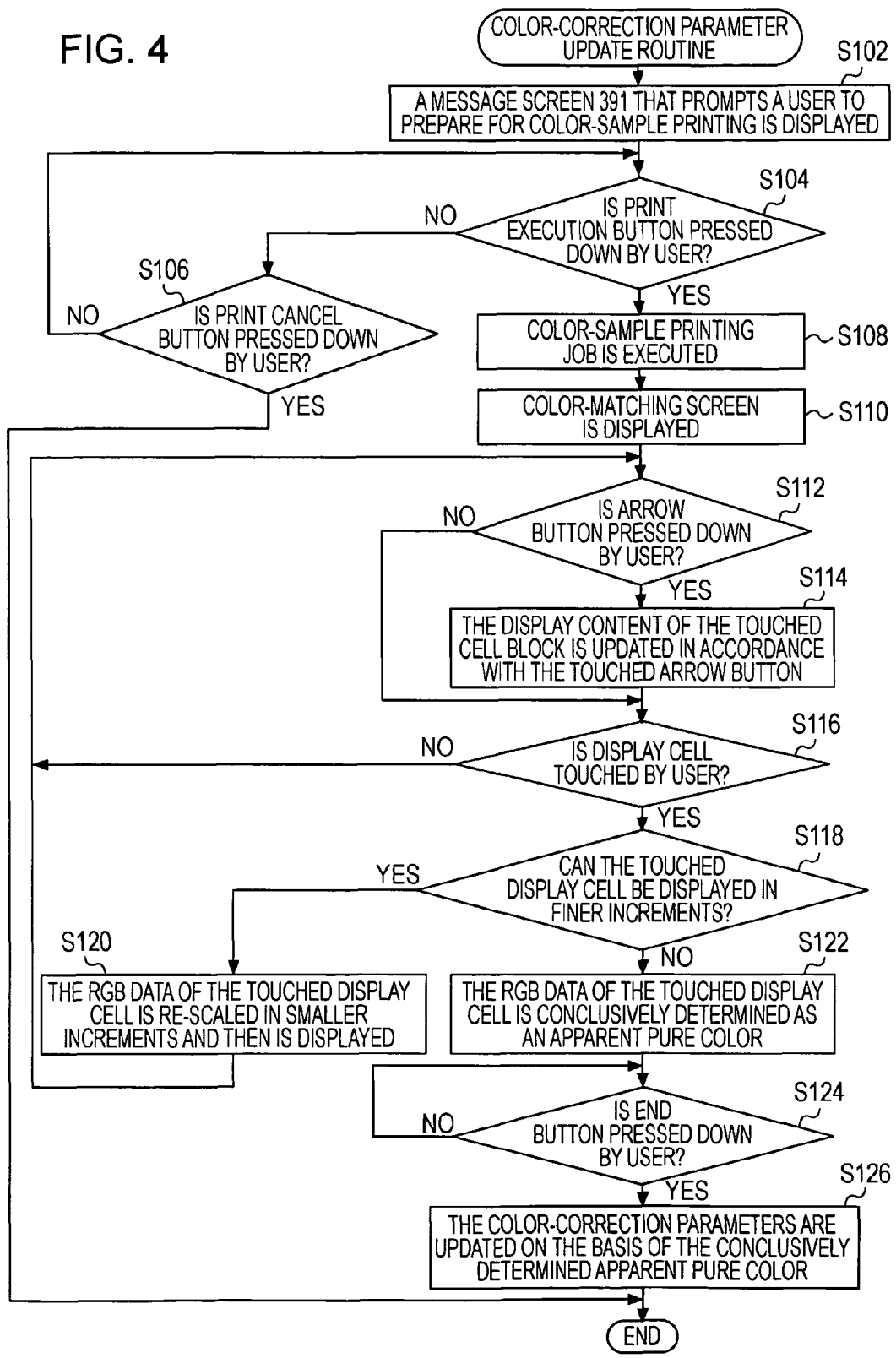
FIG. 4 is a flowchart that illustrates an example of a color-correction parameter update routine according to an exemplary embodiment of the invention.
Figure 5A:
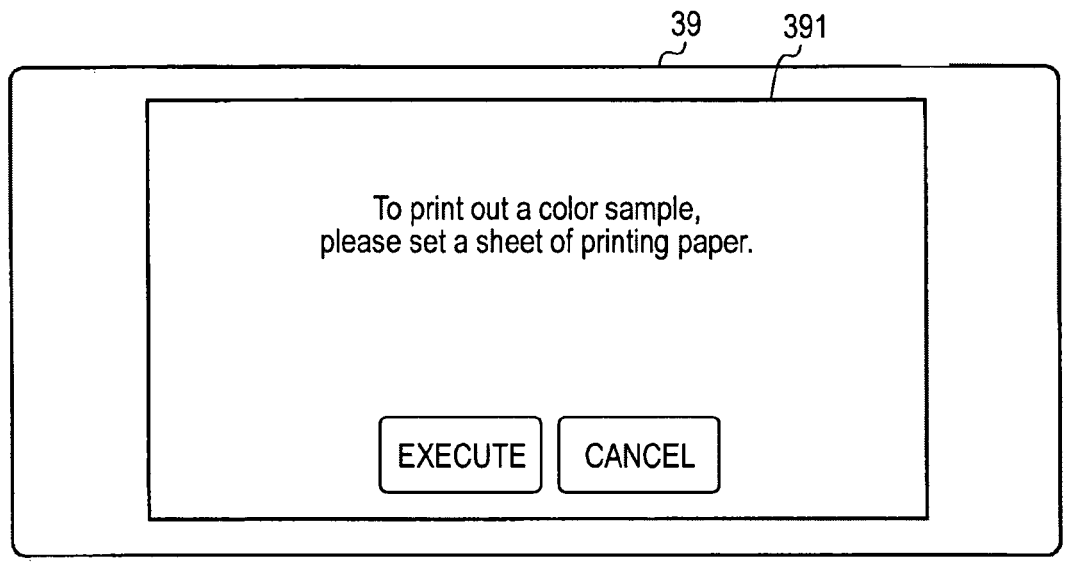

Upon the reception of user instructions for changing the color-correction parameters, the CPU 71 of the controller 70 reads a program of a color-correction parameter update routine out of the ROM 72 thereof. Then, the controller 70 executes the color-correction parameter update program that has been read out thereof. FIG. 4 is a flowchart that illustrates an example of a color-correction parameter update routine according to an exemplary embodiment of the invention. Upon the start of the color-correction parameter update routine according to the present embodiment of the invention, the CPU 71 commands the image display unit 20 of the touch-sensitive input device 39 to display a message screen 391, which pops up a message that says "To print out a color sample, please set a sheet of printing paper." (step S102). An example of the message screen 391 is illustrated in FIG. 5A.

Figure 5B:
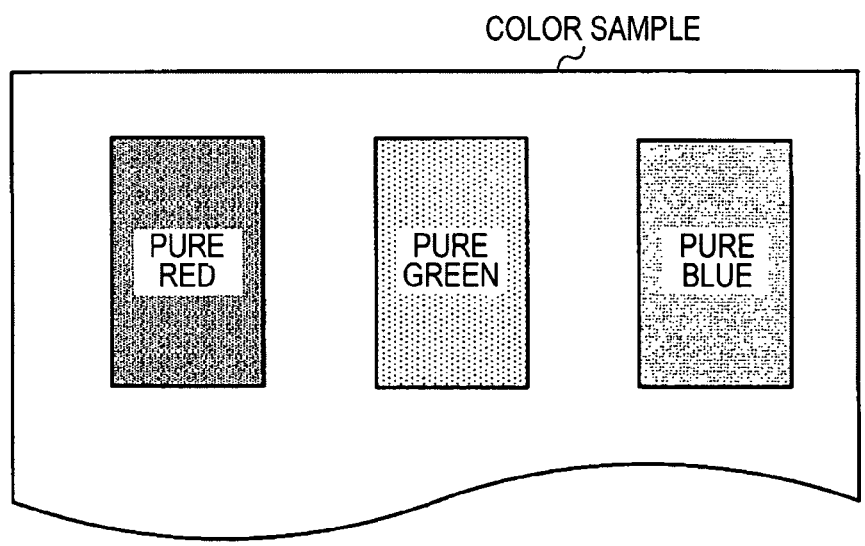
FIG. 5B is a diagram that schematically illustrates an example of a printed color sample.

In addition to the above-described pop-up message that prompts a user to prepare for color-sample printing, a print execution button and a print cancel button are also displayed in the message screen 391. In the next step, the CPU 71 makes a judgment as to whether the print execution button was touched (i.e., pressed down) by the user (step S104) or not. If it is judged in the step S104 that the user did not press down the print execution button (step S104: NO), the CPU 71 makes a further judgment as to whether the print cancel button was pressed down by the user or not (step S106). If it is judged in the step S104 that the user did not press down the print execution button (step S104: NO) and further if it is judged in the step S106 that the user did not press down the print cancel button (step S106: NO), the process loops back to the judgment step S104 to wait for a user input. If it is judged in the step S106 that the user pressed down the print cancel button (step S106: YES), this color-correction parameter update routine is ended (i.e., canceled) without changing the current color-correction parameters. On the other hand, if it is judged in the step S104 that the user pressed down the print execution button (step S104: YES), the CPU 71 commands the printing mechanism 50 to execute a color-sample printing job so that color-sample print data for each of pure red, pure green, and pure blue are printed out on a sheet of print target paper (step S108). Herein, the color-sample print data for each of pure red, pure green, and pure blue are pre-stored in the ROM 72. An example of the output result of a color-sample printing job, that is, a printed color sample, is illustrated in FIG. 5B. A printed color sample shows three primary colors of pure red, pure green, and pure blue, each of which is painted in a rectangular area.

Figure 6:
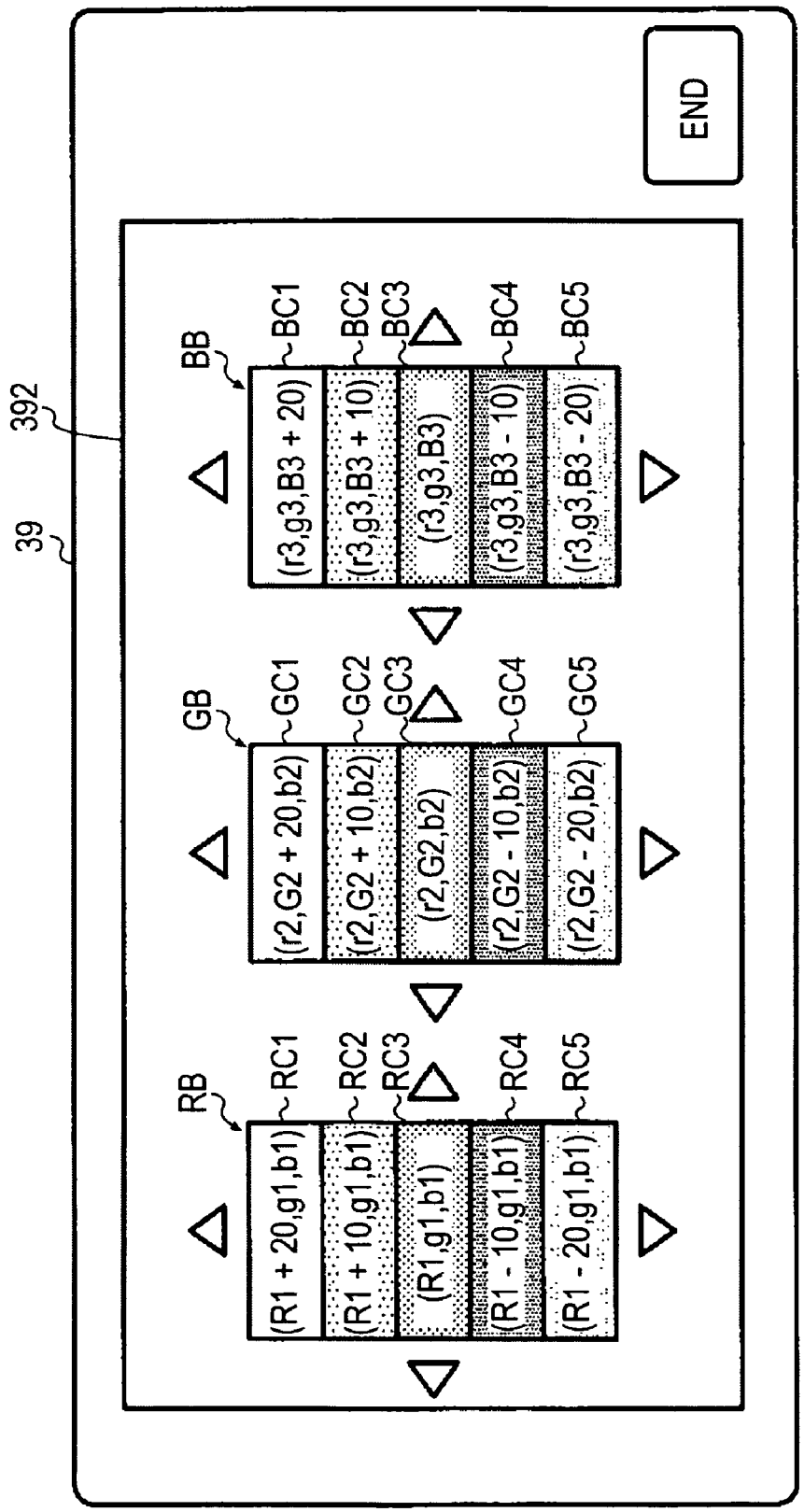
FIG. 6 is a diagram that schematically illustrates an example of a color-matching screen that is shown as a factory-default color-matching screen according to an exemplary embodiment of the invention.

In the next step, the CPU 71 commands the image display unit 20 of the touch-sensitive input device 39 to display a color-matching screen (i.e., color adjustment screen) 392 (step S110). FIG. 6 is a diagram that schematically illustrates an example of the color-matching screen 392 that is shown as a factory-default (i.e., initial-setting) color-matching screen according to an exemplary embodiment of the invention. As illustrated in FIG. 6, the color-matching screen 392 shows a red cell block RB, a green cell block GB, and a blue cell block BB. In the illustrated example, the red cell block RB is made up of five red display cells RC1, RC2, RC3, RC4, and RC5. These red display cells RC1, RC2, RC3, RC4, and RC5 are arrayed in a vertical direction. The green cell block GB is made up of five green display cells GC1, GC2, GC3, GC4, and GC5. These green display cells GC1, GC2, GC3, GC4, and GC5 are arrayed in a vertical direction. The blue cell block BB is made up of five blue display cells BC1, BC2, BC3, BC4, and BC5. These blue display cells BC1, BC2, BC3, BC4, and BC5 are arrayed in a vertical direction. Among these five red display cells RC1, RC2, RC3, RC4, and RC5 of the red cell block RB, the central red display cell RC3 displays the RGB data of a factory-default apparent pure red, which is expressed as (R1, g1, b1). The respective RGB data of the remaining red display cells RC1, RC2, RC4, and RC5 of the red cell block RB are set in such a manner that the intensity (i.e., value) of red color component thereof relative to that of the central red display cell RC3 increases without any change in the values (i.e., intensities) of green color component g1 and blue color component b1 thereof as the relative layout position thereof goes up, whereas the intensity of red color component thereof relative to that of the central red display cell RC3 decreases without any change in the values of green color component g1 and blue color component b1 thereof as the relative layout position thereof goes down. That is, the intensity of red color component of the uppermost (i.e., position-wise) red display cell RC1 is set higher than that of the red display cell RC2 without any difference in the green value g1 and the blue value b1 therebetween. The intensity of red color component of the red display cell RC2 is set higher than that of the central red display cell RC3 without any difference in the green value g1 and the blue value b1 therebetween. The intensity of red color component of the lowermost red display cell RC5 is set lower than that of the red display cell RC4 without any difference in the green value g1 and the blue value b1 therebetween. The intensity of red color component of the red display cell RC4 is set lower than that of the central red display cell RC3 without any difference in the green value g1 and the blue value b1 therebetween. In other words, the red cell block RB is made up of an array of these five red display cells RC1, RC2, RC3, RC4, and RC5 in which the intensity of the red color component only changes stepwise with the RGB data of the center red display cell RC3, which is (R1, g1, b1), being taken as a base (reference) set of values. Among the above-described five green display cells GC1, GC2, GC3, GC4, and GC5 of the green cell block GB, the central green display cell GC3 displays the RGB data of a factory-default apparent pure green, which is expressed as (r2, G2, b2). The respective RGB data of the remaining green display cells GC1, GC2, GC4, and GC5 of the green cell block GB are set in such a manner that the intensity of green color component thereof relative to that of the central green display cell GC3 increases without any change in the values of red color component r2 and blue color component b2 thereof as the relative layout position thereof goes up, whereas the intensity of green color component thereof relative to that of the central green display cell GC3 decreases without any change in the values of red color component r2 and blue color component b2 thereof as the relative layout position thereof goes down. That is, the intensity of green color component of the uppermost green display cell GC1 is set higher than that of the green display cell GC2 without any difference in the red value r2 and the blue value b2 therebetween. The intensity of green color component of the green display cell GC2 is set higher than that of the central green display cell GC3 without any difference in the red value r2 and the blue value b2 therebetween. The intensity of green color component of the lowermost green display cell GC5 is set lower than that of the green display cell GC4 without any difference in the red value r2 and the blue value b2 therebetween. The intensity of green color component of the green display cell GC4 is set lower than that of the central green display cell GC3 without any difference in the red value r2 and the blue value b2 therebetween. In other words, the green cell block GB is made up of an array of these five green display cells GC1, GC2, GC3, GC4, and GC5 in which the intensity of the green color component only changes stepwise with the RGB data of the center green display cell GC3, which is (r2, G2, b2), being taken as a base (reference) set of values. Among the above-described five blue display cells BC1, BC2, BC3, BC4, and BC5 of the blue cell block BB, the central blue display cell BC3 displays the RGB data of a factory-default apparent pure blue, which is expressed as (r3, g3, B3). The respective RGB data of the remaining blue display cells BC1, BC2, BC4, and BC5 of the blue cell block BB are set in such a manner that the intensity of blue color component thereof relative to that of the central blue display cell BC3 increases without any change in the values of red color component r3 and green color component g3 thereof as the relative layout position thereof goes up, whereas the intensity of blue color component thereof relative to that of the central blue display cell BC3 decreases without any change in the values of red color component r3 and green color component g3 thereof as the relative layout position thereof goes down. That is, the intensity of blue color component of the uppermost blue display cell BC1 is set higher than that of the blue display cell BC2 without any difference in the red value r3 and the green value g3 therebetween. The intensity of blue color component of the blue display cell BC2 is set higher than that of the central blue display cell BC3 without any difference in the red value r3 and the green value g3 therebetween. The intensity of blue color component of the lowermost blue display cell BC5 is set lower than that of the blue display cell BC4 without any difference in the red value r3 and the green value g3 therebetween. The intensity of blue color component of the blue display cell BC4 is set lower than that of the central blue display cell BC3 without any difference in the red value r3 and the green value g3 therebetween. In other words, the blue cell block BB is made up of an array of these five blue display cells BC1, BC2, BC3, BC4, and BC5 in which the intensity of the blue color component only changes stepwise with the RGB data of the center blue display cell BC3, which is (r3, g3, B3), being taken as a base (reference) set of values. As illustrated in FIG. 6, in the configuration of the color-matching screen 392 according to the present embodiment of the invention, the values of red color components of the red display cells RC1, RC2, RC3, RC4, and RC5 that are arrayed adjacent to each other are scaled (i.e., graduated) in increments of ten. The values of green color components of the green display cells GC1, GC2, GC3, GC4, and GC5 that are arrayed adjacent to each other and the values of blue color components of the blue display cells BC1, BC2, BC3, BC4, and BC5 that are arrayed adjacent to each other are also scaled in increments of ten.

Figure 7:
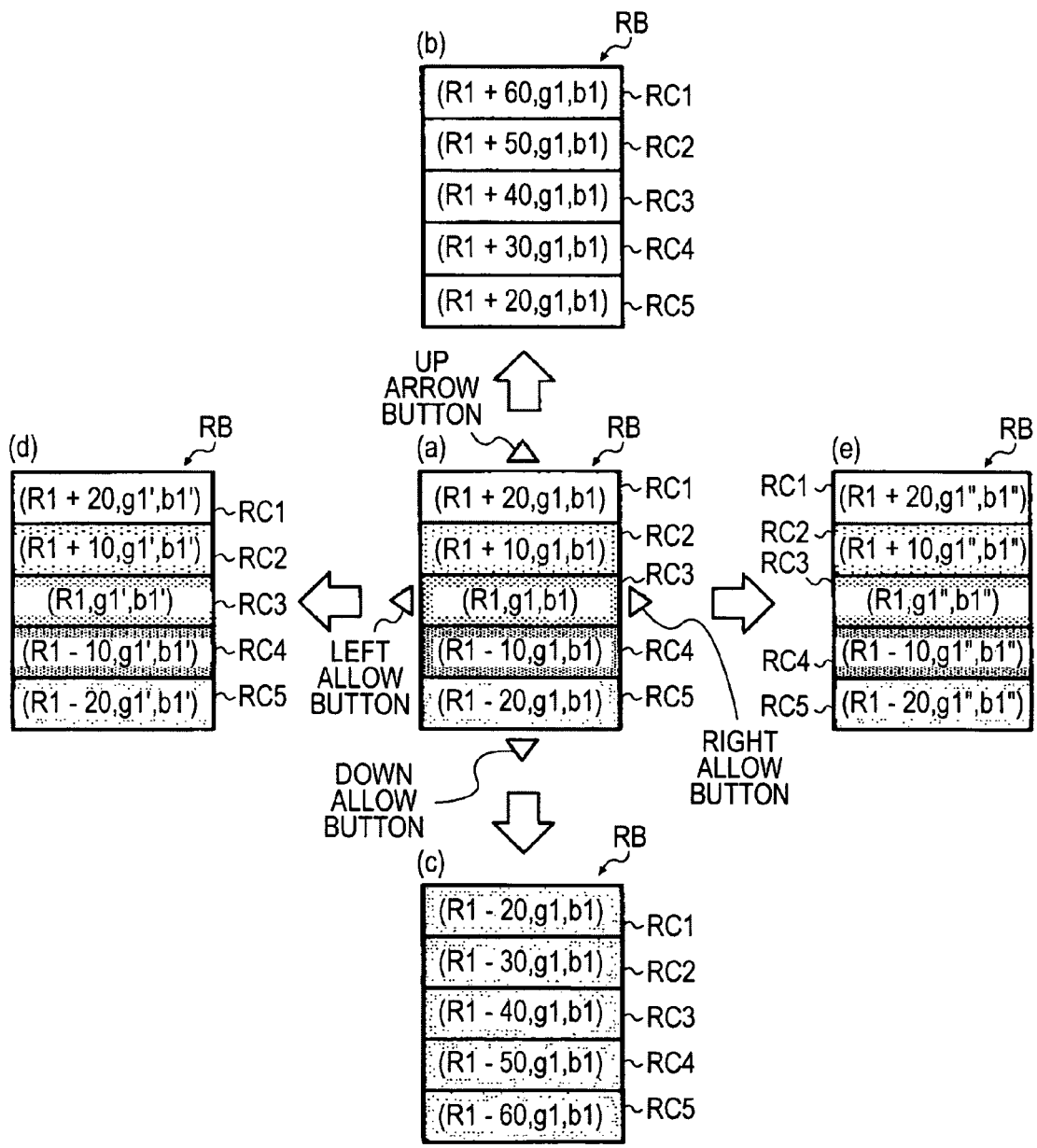
FIG. 7 is a display transition diagram that schematically illustrates an example of the relationship between each of arrow buttons that are manipulated by a user and the corresponding updated red display cells of a red cell block according to an exemplary embodiment of the invention.

An up arrow button is shown over the red cell block RB in the color-matching screen 392, whereas a down arrow button is shown under the red cell block RB in the color-matching screen 392. FIG. 7 is a display transition diagram that schematically illustrates an example of the relationship between each of arrow buttons that are manipulated by a user and the corresponding updated red display cells RC1, RC2, RC3, RC4, and RC5 thereof according to an exemplary embodiment of the invention. Upon the touching of the up arrow button by a user at the time when the red cell block RB is in a display state (a) illustrated in FIG. 7, the content of the red cell block RB is updated so as to transition to a display state (b) shown therein. Specifically, a display color that was shown in the uppermost red display cell RC1 of the red cell block RB in the display state (a) moves to the lowermost red display cell RC5 of the red cell block RB in the display state (b). The respective RGB data of the remaining red display cells RC1, RC2, RC3, and RC4 of the red cell block RB are updated in such a manner that the intensity of red color component thereof relative to that of the lowermost red display cell RC5 increases stepwise without any change in the values of green color component g1 and blue color component b1 thereof as the relative layout position thereof goes up. On the other hand, upon the touching of the down arrow button by a user at the time when the red cell block RB is in the display state (a) illustrated in FIG. 7, the content of the red cell block RB is updated so as to transition to a display state (c) shown therein. Specifically, a display color that was shown in the lowermost red display cell RC5 of the red cell block RB in the display state (a) moves to the uppermost red display cell RC1 of the red cell block RB in the display state (c). The respective RGB data of the remaining red display cells RC2, RC3, RC4, and RC5 of the red cell block RB are updated in such a manner that the intensity of red color component thereof relative to that of the uppermost red display cell RC1 decreases stepwise without any change in the values of green color component g1 and blue color component b1 thereof as the relative layout position thereof goes down. A left arrow button is shown to the left of the red cell block RB in the color-matching screen 392, whereas a right arrow button is shown to the right of the red cell block RB in the color-matching screen 392. Upon the touching of the left arrow button by a user at the time when the red cell block RB is in the display state (a) illustrated in FIG. 7, the content of the red cell block RB is updated so as to transition to a display state (d) shown therein. Specifically, the intensities (i.e., values) of the green color component and the blue color component are changed from g1 and b1 to g1' and b1', respectively, for each of the red display cells RC1, RC2, RC3, RC4, and RC5 thereof, without changing the value of the red color component thereof. As a result thereof, the updated red display cells RC1, RC2, RC3, RC4, and RC5 thereof show red with a decreased tinge of yellow as a whole. On the other hand, upon the touching of the right arrow button by a user at the time when the red cell block RB is in the display state (a) illustrated in FIG. 7, the content of the red cell block RB is updated so as to transition to a display state (e) shown therein. Specifically, the intensities of the green color component and the blue color component are changed from g1 and b1 to g1" and b1", respectively, for each of the red display cells RC1, RC2, RC3, RC4, and RC5 thereof, without changing the value of the red color component thereof. As a result thereof, the updated red display cells RC1, RC2, RC3, RC4, and RC5 thereof show red with an increased tinge of yellow as a whole. As explained above, a hue, that is, color phase, changes as a user presses down the left arrow button or the right arrow button. The same explanation as given above for the red cell block RB holds true for the green cell block GB and the blue cell block BB. That is, each of the green cell block GB and the blue cell block BB shows an up arrow button, a down arrow button, a left arrow button, and a right arrow button. Display content thereof is updated when a user presses down any one of these arrow buttons.

Referring back to the flowchart of FIG. 4, the color-correction parameter update routine according to the present embodiment of the invention is further explained below. After the displaying of the color-matching screen 392 illustrated in FIG. 6 in the step S110, the CPU 71 makes a judgment as to whether the position of any one of the above-described up arrow button, down arrow button, left arrow button, and right arrow button of any one of the above-described red cell block RB, green cell block GB, and blue cell block BB is in agreement with the aforementioned touch position detected by the touch-sensitive panel 40 or not (step S112). If it is judged that the position of any one of the up arrow button, the down arrow button, the left arrow button, and the right arrow button of any of the red cell block RB, the green cell block GB, and the blue cell block BB is in agreement with the touch position detected by the touch-sensitive panel 40 (step S112: YES), the CPU 71 commands that the display content of the touched cell block should be updated in accordance with the touched arrow button (step S114). A further explanation of the updating of display content is given below while taking an example of the red cell block RB. The red cell block RB shows five red colors having red intensities different from one another stepwise in the red display cells RC1, RC2, RC3, RC4, and RC5. It should be noted that each of these five red colors is apparent red that is observed not directly but indirectly through the touch-sensitive panel 40 fixed to the image display unit 20. A user visually compares each of these apparent five red colors with the aforementioned pure red of a printed color sample. If the user recognizes that none of these apparent five red colors that are currently displayed in the red display cells RC1, RC2, RC3, RC4, and RC5 is satisfactorily close to the pure red of the printed color sample, they press down appropriate one of the up arrow button, the down arrow button, the left arrow button, and the right arrow button of the red cell block RB. As a result thereof, the display content of the red cell block RB is updated. A detailed explanation as to how the display content of the red cell block RB is updated, including the display transition relationship between each of these arrow buttons that are manipulated by a user and the corresponding updated red display cells RC1, RC2, RC3, RC4, and RC5 thereof, has already been given above while referring to FIG. 7.

If it is judged that the position of none of the up arrow button, the down arrow button, the left arrow button, and the right arrow button of any of the red cell block RB, the green cell block GB, and the blue cell block BB is in agreement with the touch position detected by the touch-sensitive panel 40 (step S112: NO), which includes a case where the user did not touch the touch-sensitive panel 40 at all, as a next step, the CPU 71 makes a further judgment as to whether the position of any one of the above-described red display cells RC1, RC2, RC3, RC4, and RC5 of the above-described red cell block RB, the position of any one of the above-described green display cells GC1, GC2, GC3, GC4, and GC5 of the above-described green cell block GB, or the position of any one of the above-described blue display cells BC1, BC2, BC3, BC4, and BC5 of the above-described blue cell block BB is in agreement with the touch position detected by the touch-sensitive panel 40 or not (step S116). If it is judged that the position of none of the red display cells RC1, RC2, RC3, RC4, and RC5 of the red cell block RB, the position of none of the green display cells GC1, GC2, GC3, GC4, and GC5 of the green cell block GB, and the position of none of the blue display cells BC1, BC2, BC3, BC4, and BC5 of the blue cell block BB is in agreement with the touch position detected by the touch-sensitive panel 40 (step S116: NO), which includes a case where the user did not touch the touch-sensitive panel 40 at all, the process loops back to the judgment step S112. On the other hand, if it is judged that the position of any one of the red display cells RC1, RC2, RC3, RC4, and RC5 of the red cell block RB, the position of any one of the green display cells GC1, GC2, GC3, GC4, and GC5 of the green cell block GB, or the position of any one of the blue display cells BC1, BC2, BC3, BC4, and BC5 of the blue cell block BB is in agreement with the touch position detected by the touch-sensitive panel 40 (step S116: YES), the CPU 71 makes a further judgment as to whether the touched display cell can be displayed in finer increments or not; or in other words, the RGB data of the touched display cell can be re-scaled into a plurality of separate display cells in smaller increments or not (step S118). If it is judged that the touched display cell can be displayed in finer increments (step S118: YES), the RGB data of the touched display cell that is re-scaled in smaller increments is displayed in a plurality of separate display cells (step S120). Thereafter, the process loops back to the judgment step S112. On the other hand, if it is judged that the touched display cell cannot be displayed in finer increments (step S118: NO), the RGB data of the touched display cell is conclusively determined as an apparent pure color (step S122). Thereafter, the CPU 71 makes a judgment as to whether an end button shown on the color-matching screen 392 was pressed down by the user or not (step S124).

A further explanation of the conclusive determination of an apparent pure color is given below while taking an example of the red cell block RB. The red cell block RB shows five red colors having red intensities different from one another stepwise in the red display cells RC1, RC2, RC3, RC4, and RC5. As has already been explained earlier, each of these five red colors is apparent red that is observed not directly but indirectly through the touch-sensitive panel 40 fixed to the image display unit 20. A user visually compares each of these apparent five red colors with the aforementioned pure red of a printed color sample. If the user recognizes that any one of these apparent five red colors that are currently displayed in the red display cells RC1, RC2, RC3, RC4, and RC5 is satisfactorily close to the pure red of the printed color sample, the user touches the "satisfactorily-close" red display cell RC1, RC2, RC3, RC4, or RC5 of the red cell block RB. FIG. 8 is a display transition diagram that schematically illustrates an example of the re-scaling of the RGB data of a touched display cell into a plurality of separate display cells in smaller increments and the subsequent conclusive determination of an apparent pure color for the red cell block RB according to an exemplary embodiment of the invention. In the initial setting of the color-matching screen 392 according to the present embodiment of the invention, the values of red color components of five red display cells RC1, RC2, RC3, RC4, and RC5 that are arrayed adjacent to each other in the red cell block RB are scaled in increments of ten (refer to FIG. 6 or an initial display state (a) in FIG. 8). For the purpose of explanation, it is assumed herein that a user touches the red display cell RC2 (R1+10, g1, b1). Since the touched red display cell RC2 can be displayed in finer increments, the red cell block RB is updated. Specifically, the display color of the touched red display cell RC2, the RGB data of which is expressed as (R1+10, g1, b1), moves to the position of the center red display cell RC3. In addition thereto, the RGB data of the touched display cell RC2 is re-scaled in smaller increments of one and is displayed in a plurality of separate display cells arrayed adjacent to each other. This is illustrated as the re-scaled display state (b) in FIG. 8. As a result thereof, the updated red cell block RB is made up of an array of re-scaled five red display cells RC1, RC2, RC3, RC4, and RC5, where each two adjacent ones thereof has a difference value of the red color component of one (i.e., increment of one) therebetween. For the purpose of explanation, it is further assumed herein that the user touches the re-scaled red display cell RC1 (R1+12, g1, b1). Since the touched re-scaled red display cell RC1 cannot be displayed with further finer increments, the RGB data of the touched red display cell RC1 is conclusively determined as apparent pure red. Then, the entire region of the red cell block RB is displayed in this color that is conclusively determined as the apparent pure red. This is illustrated as the color-determined display state (c) in FIG. 8. The same explanation as given above for these five red display cells RC1, RC2, RC3, RC4, and RC5 of the red cell block RB holds true for the above-described five green display cells GC1, GC2, GC3, GC4, and GC5 of the green cell block GB and the above-described five blue display cells BC1, BC2, BC3, BC4, and BC5 of the blue cell block BB. That is, for each of the green cell block GB and the blue cell block BB, the re-scaling of the RGB data of a touched display cell into a plurality of separate display cells in smaller increments and the subsequent conclusive determination of an apparent pure color (i.e., apparent pure green/apparent pure blue) are performed.

If it is judged that the user has not yet pressed down the end button shown on the color-matching screen 392 (step S124: NO), the process returns to the step S124 so that the CPU 71 makes a continued judgment. On the other hand, if it is judged that the user has pressed down the end button shown on the color-matching screen 392 (step S124: YES), the color-correction parameters are updated on the basis of the conclusively determined apparent pure color (step S126). Then, the color-correction parameter update routine according to the present embodiment of the invention is ended.

With the configuration of the photo-printer 10 according to the present embodiment of the invention described above, since each of the above-described five red display cells RC1, RC2, RC3, RC4, and RC5 of the red cell block RB, the above-described five green display cells GC1, GC2, GC3, GC4, and GC5 of the green cell block GB, and the above-described five blue display cells BC1, BC2, BC3, BC4, and BC5 of the blue cell block BB has an individual display color, when a user touches any one of these display cells, it is possible for the user to intuitively know the result of color correction during the color-correction manipulation process because the color-correction parameters are changed not through the inputting of numerical values but through the selecting of a colored display cell. That is, the user can intuitively recognize the anticipated color-correction result of a selection of a certain colored display cell during the color-correction manipulation process. Therefore, it is possible for the user to perform color-disagreement correction, if an apparent display color that is shown on the image display unit 20 and observed not directly but indirectly through the touch-sensitive panel 40 fixed thereto is not in agreement with a true color thereof, in an intuitive manner while visually confirming a resultant display color that will be obtained after the execution of the color-disagreement correction.

In addition, it is possible for a user to make a color-disagreement judgment as to whether an apparent display color that is shown on the image display unit 20 and observed not directly but indirectly through the touch-sensitive panel 40 fixed thereto is in agreement with a true color thereof or not in an easy manner by visually comparing a color sample that is printed out by the photo-printer 10 with the above-described apparent display color that is shown on the image display unit 20 and observed not directly but indirectly through the touch-sensitive panel 40 fixed thereto.

Moreover, in the initial setting of the color-matching screen 392 presented by the photo-printer 10 according to the present embodiment of the invention, the values of red color components of five red display cells RC1, RC2, RC3, RC4, and RC5 that are arrayed in the red cell block RB are scaled in increments of ten. Upon the touching of a certain red display cell among them, the RGB data of the touched display cell is, if possible, re-scaled in smaller increments of one and is displayed in a plurality of separate display cells. Furthermore, the same re-scaling configuration as that of the red color components of five red display cells RC1, RC2, RC3, RC4, and RC5 of the red cell block RB is adopted for the green color components of five green display cells GC1, GC2, GC3, GC4, and GC5 of the green cell block GB and the blue color components of five blue display cells BC1, BC2, BC3, BC4, and BC5 of the blue cell block BB. Therefore, it is possible for a user to perform a rough color matching by means of initially scaled display cells with a larger increment value. Thereafter, the user can perform a fine color matching by means of re-scaled display cells with a smaller increment value. With such an advantageous configuration, in comparison with a case where color matching is performed by means of a fine increment value only without the use of a larger increment value at its initial color-matching stage, it is possible for a user to complete color-disagreement correction in a shorter time period in a more efficient manner.

Furthermore, in the configuration of the color-matching screen 392 presented by the photo-printer 10 according to the present embodiment of the invention, even when a certain apparent red color that is shown on the image display unit 20 and monitored not directly but indirectly through the touch-sensitive panel 40 fixed thereto has a greater or lesser tinge of yellow than that of pure red, a user can adjust the tinge of yellow of the displayed red, or in other words, a user can change the hue (i.e., color phase) of the displayed red, by touching the left arrow button that is provided to the left of the red cell block RB or by touching the right arrow button that is provided to the right of the red cell block RB. Through such a hue control (i.e., color-phase adjustment), the user can make correction so that the displayed red comes closer to the pure red.

Needless to say, the invention should be in no case understood to be restricted to any exemplary embodiment thereof described above. That is, the invention may be configured or implemented in an adaptable manner in a variety of variations or modifications thereof without departing from the spirit thereof, which should be deemed to be encompassed within the technical scope thereof.

In the foregoing exemplary embodiment of the invention, a left arrow button is displayed to the left of each of the red cell block RB, the green cell block GB, and the blue cell block BB for changing a hue, whereas a right arrow button is displayed to the right of each of the red cell block RB, the green cell block GB, and the blue cell block BB for the same purpose. However, the scope of the invention is not limited to such an exemplary configuration. For example, these left and right arrow buttons may be omitted. If these left and right arrow buttons are omitted, although color-matching precision in making a display color close to a pure color becomes lower in comparison with the configuration of the color-matching screen 392 presented by the photo-printer 10 according to the foregoing exemplary embodiment of the invention, such a modified configuration offers a satisfactory precision when it is applied to a more simple correction use at lower cost.

In the foregoing exemplary embodiment of the invention, the touch-sensitive panel 40 is configured as a resistive-film type panel. However, the scope of the invention is not limited to such an exemplary configuration. For example, the touch-sensitive panel 40 may be configured as an infrared type panel. Or, the touch-sensitive panel 40 may be configured as an analog capacitive coupling type panel. Alternatively, the touch-sensitive panel 40 may be configured as an ultrasonic type panel. Or, a further alternative sensing scheme other than those enumerated above may be adopted. Even with any of the above-described modified configurations of the touch-sensitive panel 40, the photo-printer 10 according to the foregoing exemplary embodiment of the invention offers the same advantageous effects as those explained above.

As described above, in the initial setting of the color-matching screen 392 presented by the photo-printer 10 according to the foregoing exemplary embodiment of the invention, the values (i.e., intensities) of red color components of five red display cells RC1, RC2, RC3, RC4, and RC5 that are arrayed in the red cell block RB are scaled in increments of ten. Upon the touching of a certain red display cell among them, the RGB data of the touched display cell is, if possible, re-scaled in smaller increments of one and is displayed in a plurality of separate display cells. Furthermore, the same re-scaling configuration as that of the red color components of five red display cells RC1, RC2, RC3, RC4, and RC5 of the red cell block RB is adopted for the green color components of five green display cells GC1, GC2, GC3, GC4, and GC5 of the green cell block GB and the blue color components of five blue display cells BC1, BC2, BC3, BC4, and BC5 of the blue cell block BB. However, the scope of the invention is not limited to such an exemplary configuration. For example, these values may be scaled in increments of not ten but one in the initial setting of the color-matching screen 392. As another non-limiting modification example thereof, these values that are scaled in increments of ten in the initial setting of the color-matching screen 392 may be re-scaled in increments of not one but five upon the touching of a certain display cell, which is further re-scaled in increments of one upon the further touching of a certain display cell.

In the foregoing exemplary embodiment of the invention, it is explained that pure red, pure green, and pure blue are adopted as a red base color, a green base color, and a blue base color, respectively. However, the scope of the invention is not limited to such an exemplary configuration. For example, any other impure color that contains red as its main color component and further contains a small amount of green and/or blue, which is not pure red, may be adopted as the red base color. The same applies for green and blue. That is, any other impure color that contains green as its main color component and further contains a small amount of red and/or blue, which is not pure green, may be adopted as the green base color. Any other impure color that contains blue as its main color component and further contains a small amount of red and/or green, which is not pure blue, may be adopted as the blue base color.

In the foregoing exemplary embodiment of the invention, the ink-jet photo-printer 10 is taken as an example of an image processing apparatus according to an exemplary embodiment of the invention. Notwithstanding the foregoing, the invention can be applied to or embodied as, as a non-limiting application/embodiment example thereof, a multifunction printer or facsimile that is provided with a scanner and the like in addition to an ink-jet printing mechanism. As another non-limiting application/embodiment example thereof, the invention is applicable to a touch-sensitive input device that is not provided with the printing mechanism 50.

What is claimed is:

1. A printing apparatus comprising:
    a printing section that performs printing on a print target medium;
    a display unit that displays various kinds of information;
    a touch-sensitive panel that is overlaid on a surface of the display unit and detects a position touched by a user;
    a display controlling section that controls the display unit so as to display a red cell block, a green cell block, and a blue cell block,
    the red cell block comprising an array of a plurality of red display cells in which a value of a red color component changes stepwise from a base set of values of red, green, and blue, the base set of values being a set of red, green, and blue values that is recognized by the user as an apparent red base color when shown on the display unit and observed through the touch-sensitive panel,
    the green cell block comprising an array of a plurality of green display cells in which a value of a green color component changes stepwise with a set of values of red, green, and blue, the base set of values being a set of red, green, and blue values that is recognized by the user as an apparent green base color when shown on the display unit and observed through the touch-sensitive panel,
    the blue cell block comprising an array of a plurality of blue display cells in which a value of a blue color component changes stepwise with a set of values of red, green, and blue, the base set of values being a set of red, green, and blue values that is recognized by the user as an apparent blue base color when shown on the display unit and observed through the touch-sensitive panel;
    a three-primary-color correcting section that sets a corrected set of values that is recognized by the user as the apparent red base color, a corrected set of values that is recognized by the user as the apparent green base color, and a corrected set of values that is recognized by the user as the apparent blue base color, on the basis of a comparison made between a position of each of the red display cells in the red cell block, a position of each of the green display cells in the green cell block, and a position of each of the blue display cells in the blue cell block and a touch position detected by the touch-sensitive panel, respectively; and
    a print controlling section that controls the printing section to print a true red base color, a true green base color, and a true blue base color as a color sample that is used when the three-primary-color correcting section performs correction.

2. The printing apparatus according to claim 1, wherein the set of values of red, green, and blue can be changed in a predetermined number of increments;
    the display controlling section scales the values of red color components of the red display cells that are arrayed in the red cell block initially in a certain number of increments, and upon the touching of a certain red display cell among the plurality of red display cells by a user, re-scales the touched display cell in increments of one so as to be displayed in a plurality of separate display cells, scales the values of green color components of the green display cells that are arrayed in the green cell block initially in a certain number of increments, and upon the touching of a certain green display cell among the plurality of green display cells by a user, re-scales the touched display cell in increments of one so as to be displayed in a plurality of separate display cells, and scales the values of blue color components of the blue display cells that are arrayed in the blue cell block initially in a certain number of increments, and upon the touching of a certain blue display cell among the plurality of blue display cells by a user, re-scales the touched display cell in increments of one so as to be displayed in a plurality of separate display cells; and
    the three-primary-color correcting section performs correction on the basis of a comparison made between the position of each of the red display cells of the red cell block whose red component values are re-scaled in increments of one, the position of each of the green display cells of the green cell block whose green component values are re-scaled in increments of one, the position of each of the blue display cells of the blue cell block whose blue component values are re-scaled in increments of one and a touch position detected by the touch-sensitive panel, respectively.

3. The printing apparatus according to claim 1, wherein, when it is judged that a user has instructed a hue change for any of the red cell block, the green cell block, or the blue cell block on the basis of information on a touch position detected by the touch-sensitive panel, the display controlling section updates the red cell block by changing the values of green and blue thereof without changing the value of red thereof so as to have a plurality of updated red display cells if the red cell block is the above-mentioned hue-change-instructed cell block, updates the green cell block by changing the values of blue and red thereof without changing the value of green thereof so as to have a plurality of updated green display cells if the green cell block is the above-mentioned hue-change-instructed cell block, and updates the blue cell block by changing the values of red and green thereof without changing the value of blue thereof so as to have a plurality of updated blue display cells if the blue cell block is the above-mentioned hue-change-instructed cell block.

4. The printing apparatus according to claim 1, wherein the red base color, the green base color, and the blue base color are pure red, pure green, and pure blue, respectively.

5. A method for controlling, by a controller, a printing apparatus that includes a printing section that performs printing on a print target medium, a display unit that displays various kinds of information, and a touch-sensitive panel that is overlaid on a surface of the display unit and detects a position touched by a user; the controlling method comprising:

controlling the display unit so as to display a red cell block, a green cell block, and a blue cell block, the red cell block comprising an array of a plurality of red display cells in which a value of a red color component exchanges stepwise from a base set of values of red, green, and blue, the base set of values being a set of red, green, and blue values that is recognized by the user as an apparent red base color when shown on the display unit and observed not directly but indirectly through the touch-sensitive panel, the green cell block comprising an array of a plurality of green display cells in which a value of a green color component changes stepwise from a certain set of values of red, green, and blue, the base set of values being a set of red, green and blue values that is recognized by the user as an apparent green base color when shown on the display unit and observed through the touch-sensitive panel, the blue cell block comprising an array of a plurality of blue display cells in which a value of a blue color component changes stepwise from a base set of values of red, green, and blue, the base set of values being a set of red, green, and blue values that is recognized by the user as an apparent blue base color when shown on the display unit and observed through the touch-sensitive panel;

setting a corrected set of values that is recognized by the user as the apparent red base color, a corrected set of values that is recognized by the user as the apparent green base color, and a corrected set of values that is recognized by the user as the apparent blue base color, on the basis of a comparison made between a position of each of the red display cells in the red cell block, a position of each of the green display cells in the green cell block, and a position of each of the blue display cells in the blue cell block and a touch position detected by the touch-sensitive panel, respectively; and controlling the printing section to print a true red base color, a true green base color, and a true blue base color as a color sample that is used when correction is performed.

* * * * *